United States Patent [19]

Hagiya

[11] Patent Number: 4,992,730
[45] Date of Patent: Feb. 12, 1991

[54] METHOD OF COMPUTING THE ROTATING SPEED OF A ROTATING BODY BASED UPON PULSE TRAIN SIGNALS FROM A ROTATING SPEED SENSOR

[75] Inventor: Naoyuki Hagiya, Ageo, Japan

[73] Assignee: Akebono Brake Industry Co., Ltd., Tokyo, Japan

[21] Appl. No.: 387,131

[22] Filed: Jul. 28, 1989

[30] Foreign Application Priority Data

Aug. 5, 1988 [JP] Japan .................... 63-194397

[51] Int. Cl.$^5$ .................................. G01P 3/42
[52] U.S. Cl. .................................... 324/160
[58] Field of Search .............. 324/207.11, 207.22, 324/207.25, 160, 161, 163, 166, 167, 173, 174, 175

[56] References Cited

U.S. PATENT DOCUMENTS

| | | | |
|---|---|---|---|
| 4,281,388 | 7/1981 | Friend et al. | 324/166 X |
| 4,527,101 | 7/1985 | Zavis et al. | 324/161 X |
| 4,527,248 | 7/1985 | Takase et al. | 324/160 X |
| 4,531,090 | 7/1985 | Hill | 324/207.22 |
| 4,609,869 | 9/1986 | Metcalf | 324/207.11 |
| 4,885,710 | 12/1989 | Hersberger et al. | 324/166 X |

Primary Examiner—Reinhard J. Eisenzopf
Assistant Examiner—Warren S. Edmonds

[57] ABSTRACT

A method of computing the rotating speed of a rotating body includes the steps of setting speed computation reference time periods with respect to a pulse train signal obtained from the output of a rotating speed sensor; measuring time length from the last pulse edge in the previous speed computation reference time period to the last pulse edge in the current speed computation reference time period; and computing the rotating speed of the rotating body on the basis of the result of the time length measurement. The time point when the previous procedure of speed computation terminated corresponds to the time point when the current procedure of speed computation starts, thus making it possible to achieve continuous speed computation. In this way, an enhanced accuracy can be achieved in speed measurement for low speed range, which leads to improved control performance in anti-lock control and traction control for the low speed range.

4 Claims, 5 Drawing Sheets

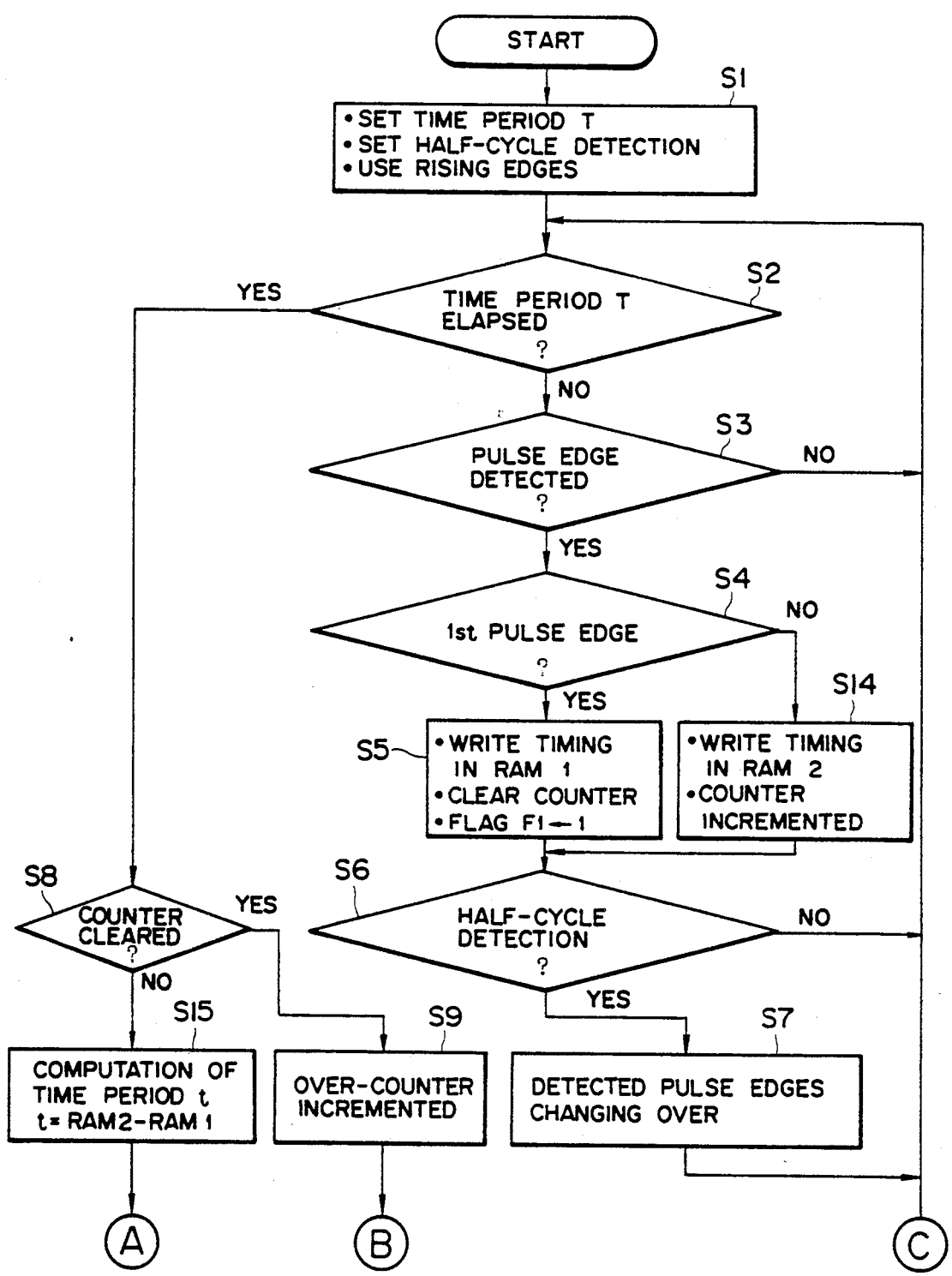

METHOD OF COMPUTING THE ROTATING SPEED OF A ROTATING BODY BASED UPON PULSE TRAIN SIGNALS FROM A ROTATING SPEED SENSOR

BACKGROUND OF THE INVENTION

1. Field of the Invention

This invention relates to a system for computing the rotating speed of a rotating body, and more particularly it pertains to a system for computing the rotating speed of a rotating body, suitable for use in the computation of wheel speed of a motor vehicle in anti-lock control to prevent the wheels of the motor vehicle from being locked when brake is applied or in traction control to prevent the driving wheels of the motor vehicle from skidding when the motor vehicle is started or accelerated.

b 2. Description of the Prior Art:

In anti-lock control to prevent wheels of a motor vehicle from being locked when brake is applied, in traction control to prevent the driving wheels of the motor vehicle from skidding when the motor vehicle is started or accelerated, or in cruising control to permit a motor vehicle to run at a constant speed, computation of the wheel speed constitutes one of the most important factors. As is known in the art, accuracy of such control is greatly influenced by the accuracy in the computation of the wheel speed and the time required for such computation. Especially in anti-lock control and traction control, it is required that the wheel speed changing every moment be accurately detected; thus, highly accurate sensors should be employed to achieve such accurate detection of the wheel speed.

Such a rotor may comprise a toothed rotor called as tone wheel rotating with the wheel, and a pickup coil wound on a permanent magnet provided in the neighborhood of the rotor. As the tone wheel rotates, the distance between the tone wheel and the permanent magnet varies with the position of the teeth of the tone wheel, and as a result, the pickup coil generates an a.c. voltage with a frequency proportional to the rotating speed of the tone wheel. To compute the wheel speed from this a. c. voltage, the sinusoidal waveform of the a. c. voltage is shaped into a square waveform so that a pulse train signal such as shown in FIG. 1 is obtained. Reference time periods T of a predetermined length for speed computation are set in succession, and measurement is made of the time length from the first rising edge to the next rising edge of pulse train signal in each speed computation, i.e., time period t of one cycle (this will be referred to as "single-edge detection" hereinafter). Wheel speed Vw is calculated from the time period t using the following equation:

$$Vw = 1/(t \times k)$$

where k is a constant.

To avoid an impossibility of speed detection which tends to be caused when the frequency of the sinusoidal waveform derived from the pickup coil is too high while the wheels are running at high speed, it is the usual practice that a relatively small number of teeth is selected for the tome wheel. Thus, as will be seen from FIG. 2, when the single-edge detection as described above is made while the wheels are rotating at low speed, it tends to happen that measuring time period t extends to go beyond the range of speed computation reference time T, and if that happens, speed computation becomes impossible with respect to the respective speed computation reference time period T, thus resulting in inaccurate speed computation and deteriorating the control performance of anti-lock control and so forth. For example, if the number of teeth of the tone wheel is selected such that the pickup coil generates an a.c. voltage of 15 Hz per 1 km/h and the length of the speed computation reference time T is set at 8 ms, then it follows that measuring time t extends to go beyond the range of the speed computation reference time T when the frequency of the a.c. voltage signal derived from the pickup coil is 250 Hz or less (16.6 km/h in terms of wheel speed).

SUMMARY OF THE INVENTION

It is an object of this invention to provide a method of computing the rotating speed of a rotating body, which permits of accurate speed computation for a wide range of speed by use of a tone having a relatively small number of teeth, i.e., a relatively small amount of information.

The method according to the present invention comprises the steps of setting speed computation reference time periods with respect to a pulse train signal obtained from the output of a rotating speed sensor; measuring time length from the last pulse edge in the previous speed computation reference time period to the last pulse edge in the current speed computation reference time period; and computing the rotating speed of the rotating body on the basis of the result of the time length measurement.

According to the present invention, the time point when the previous procedure of speed computation terminated corresponds to the time point when the current procedure of speed computation starts, thus making it possible to achieve continuous speed computation. In this way, an enhanced accuracy can be achieved in speed measurement for low speed range, which leads to improved control performance in anti-lock control and traction control for the low speed range.

It should be be noted that when a tone wheel, the number of teeth of which is equal to 15 Hz/km/h as in the case described above, is employed and the length of the speed computation reference time period is set at 8 ms, the lower limit of computable frequency range can be decreased from the conventional value of 250 Hz (16.6 km/h in terms of wheel speed) down to 62.5 Hz (4.16 km/h in terms of wheel speed).

Other objects, features and advantages of the present invention will become apparent from the ensuing description taken in conjunction with the accompanying drawings.

BRIEF DESCRIPTION OF THE DRAWINGS

FIGS. 6 and 7 are flow charts useful for explaining the method of the present invention.

DESCRIPTION OF THE PREFERRED EMBODIMENTS

Figure 3:
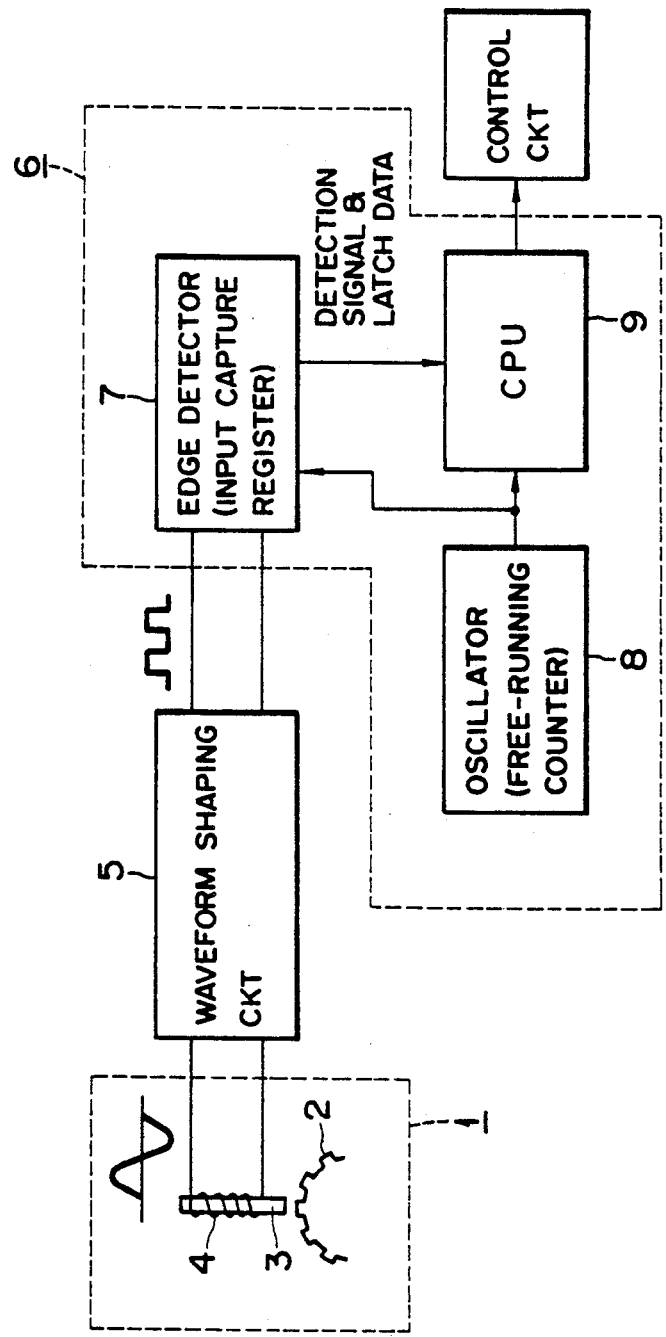
FIG. 3 is a block diagram of the apparatus for detecting the rotating speed of a rotating body, in accordance with an embodiment of the present invention.

Referring to FIG. 3, there is shown a speed sensor 1, which includes a tone wheel mounted on axle hub rotor of a motor vehicle for rotating with a wheel, and a pickup coil 4 wound on a permanent magnet 3. As the tone wheel 2 of the speed sensor 4 rotates, the a.c. voltage derived from the pickup coil 4 is converted by a waveform shaping circuit 5 into a pulse train signal, which in turn is provided to a microprocessor unit (MPU) 6. The MPU 6 comprises an edge detector 7 composed of an input capture register, a starting circuit 8 which constitutes a free-running counter, and a central processing unit 9, which includes RAM 1 and RAM 2. The edge detector 7 provides a detection signal and latch data to the CPU 9.

Figure 4:
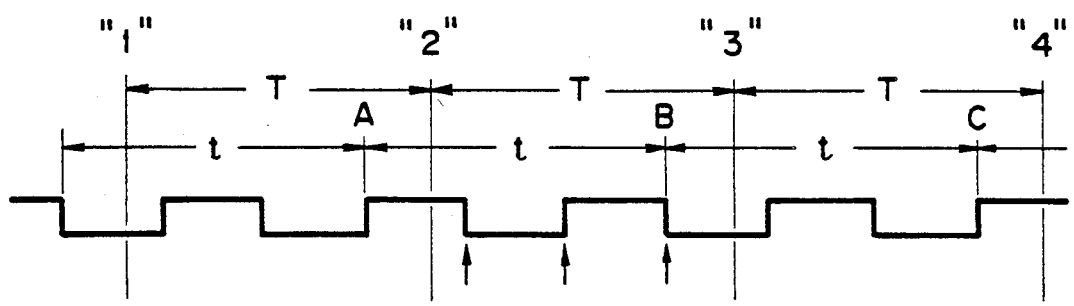
FIG. 4 is a basic timing chart useful in the method of the present invention.

In the method of the present invention, speed computation reference time periods T are set successively as in the conventional method; the time point when the last pulse edge in the previous speed computation reference time period T is detected, is used as the time point when speed measurement is started, as shown in FIG. 4; and the time point when the last pulse edge in the current speed computation reference time period is detected, is employed as the time point when the speed measurement is terminated. The basic procedure of speed computation according to the present invention is such that on the basis of measurement for the time period t from the measurement starting time point to the measurement terminating time point, speed computation is effected at speed computation reference time points "1", "2", "3", "4" and so on which are set with respect to the respective speed computation reference time periods T. The number of rising and falling pulse edges that occur within the above-mentioned measuring time period t are counted. This is referred to as "double-edge detection". In this case, a pulse edge at the measurement starting time point is not counted, bu a pulse edge at the measurement terminating time point is counted. The average cycle is determined by multiplying by 2 or doubling the quotient of a division of the time period t by the number of pulse edges detected. Wheel speed is computed on the basis of the average cycle.

For example, in speed computation effected at the time point 3 in FIG. 4, time point A when the last pulse edge occurs during the period from the time point "1" to the time point "2" in the previous speed computation reference time period T is used as the measurement starting time point; and time point B when the last pulse edge occurs during the period from the time point "2" to the time point "3" in the current speed computation reference time period T is employed as the measurement terminating time point. In this case, the number of pulses occurring during the time period t from the time point A to the time point B, including that occurring at the time point B. Thus, the average cycle is determined by multiplying by 2 or doubling the quotient of a division of the measuring time period t by 3. From this average cycle, the wheel speed Vw is computed using the following equation:

$$Vw = 1/(\text{average cycle} \times K2)$$

where K2 is a constant.

At the next time point "4", the time period t from the time point B to time point C is measured and the wheel speed Vw is computed in the same manner as mentioned above.

The basic computation procedure for the method of this invention has described above. With reference to FIGS. 5(a) to 5(d), description will now be made of examples of the pulse edge detection logic for various speed ranges.

In FIG. 5, OCIs are speed computation reference time points set for the fixed speed computation reference T (8 ms).

Figure 5A:
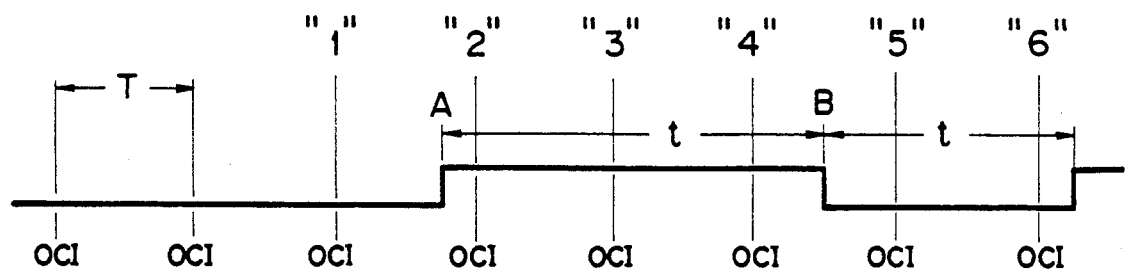
FIGS. 5(a) to 5(d) are timing charts in the method of the present invention for various speed ranges.

FIG. 5(a) shows pulse edge detection logic for measuring a time period t when a motor vehicle starts or runs at very low speed. When the motor vehicle starts, time point A when a pulse edge is detected during the time period from the time point "1" to the time point "2", is used as the measurement starting time point, and if a pulse edge is detected by the time point 2 in the next speed computation reference time period T, the time point when the last pulse edge is detected, is set as the measurement terminating time point. Wheel speed is computed on the basis of the time period t thus measured.

However, in case the next pulse edge is not detected by the time point 2, then the time point B when the next pulse edge is detected, is set at the measurement terminating time point. Meanwhile, the number of time periods T during which no pulse edge is detected, is counted; when the number becomes equal to or higher than a predetermined value of K1 (K1 =4, for example), the wheel speed is regarded as Vw =0 km/h, and cyclic measurement is restarted from a time point when a pulse edge occurs next.

Figure 5B:
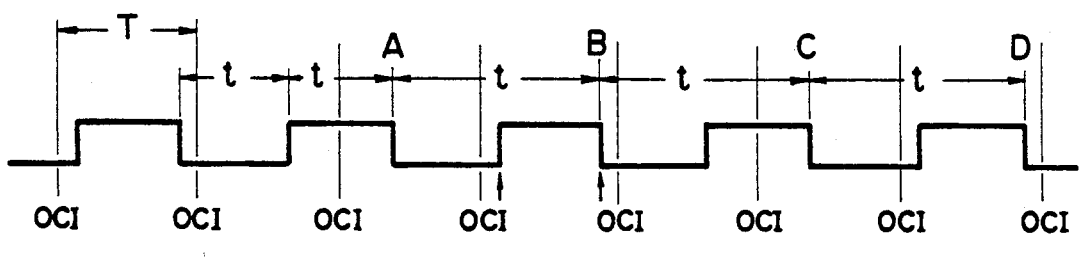

FIG. 5(b) shows pulse edge detection logic for the case where motor vehicle is running at low speed. When the motor vehicle runs at low speed, the width of a single pulse approaches the the time period T, becomes equal to one measuring time period t and constitutes the object of computation at each OCI, in which case the measurement starting/terminating time points are determined on the basis of the principle described with reference to FIG. 4. The number of pulse edges (including the pulse edge defining the measurement terminating time) which are detected during the measuring time is counted; and time period t is divided by number of times that pulse edges are detected and doubled so that an average cycle is computed, the result of the computation being used to compute the wheel speed. As shown in FIG. 5(b), two pulse edges are detected during each of the time periods from A-B, B-C and C-D, and thus the time period t represents the length of one cycle.

Figure 5C:
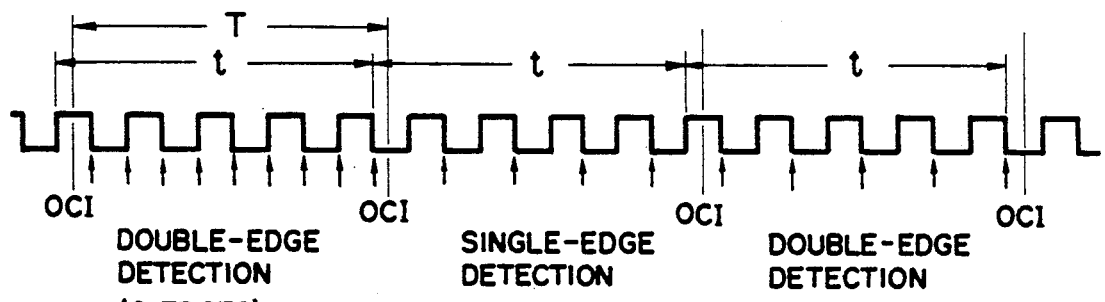

FIG. 5(c) shows pulse-edge detection logic for the case where the number of pulse edges is increased as the wheel speed Vw is increased. When the rising and falling pulse edges of a pulse train signal are detected, that is, in the case of half-cycle detection, the number of pulse edges which occur during one measuring time period t increases as the wheel speed Vw becomes higher, so that the pulse edges counting procedure take a long time, thus leaving insufficient time to effect other kinds of control processing. To cope with such a situation, when the motor vehicle runs at high speed, the pulse edge detection mode is changed over from double-edge detection (half-cycle detection) to single edge detection (full-cycle detection). The condition for such change-over is such that the number of times that double pulse edges are detected during one measuring time period becomes equal to or higher than a predetermined number of times (9 times in FIG. 5(c), for example). By effecting such change-over, the number of pulse edges to be detected can be reduced by half, thereby reducing the processing time.

Figure 5D:
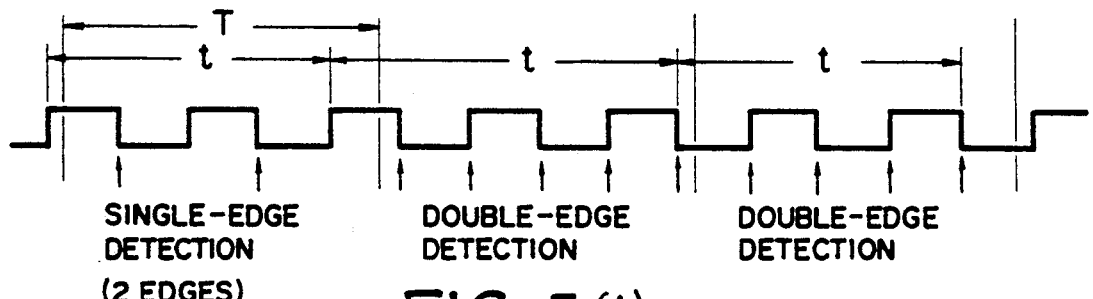

FIG. 5(d) shows pulse edge detection logic for the case where the number of pulse edges detected is decreased because of the wheel speed Vw being decreased from the high-speed level while full-cycle detection is being effected. In this case, the pulse edge detection mode is switched from single-edge detection (full-cycle detection) to double-edge detection (half-cycle detection) when the number of times that pulse edge is detected through single-edge detection, becomes less than a prescribed number of times (twice in FIG. 5).

Figure 1:
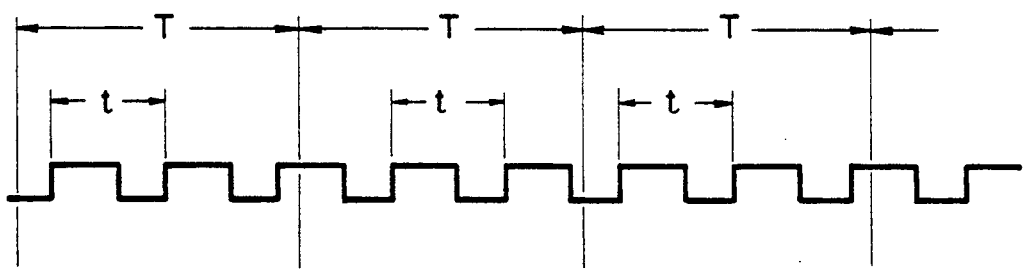
FIGS. 1 and 2 are timing charts useful for explaining the conventional method of computing the rotating speed of a rotating body.
Figure 2:
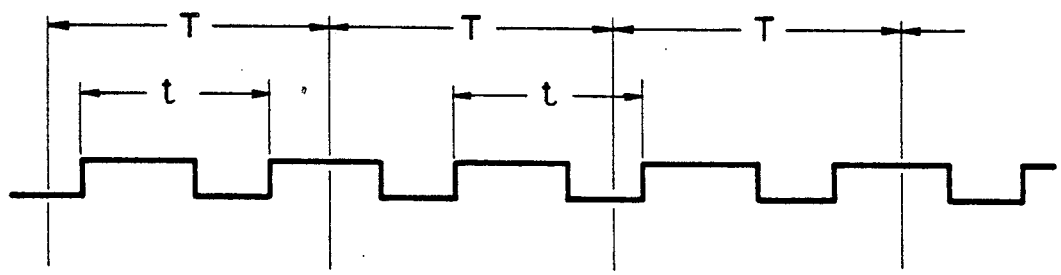
Figure 7:
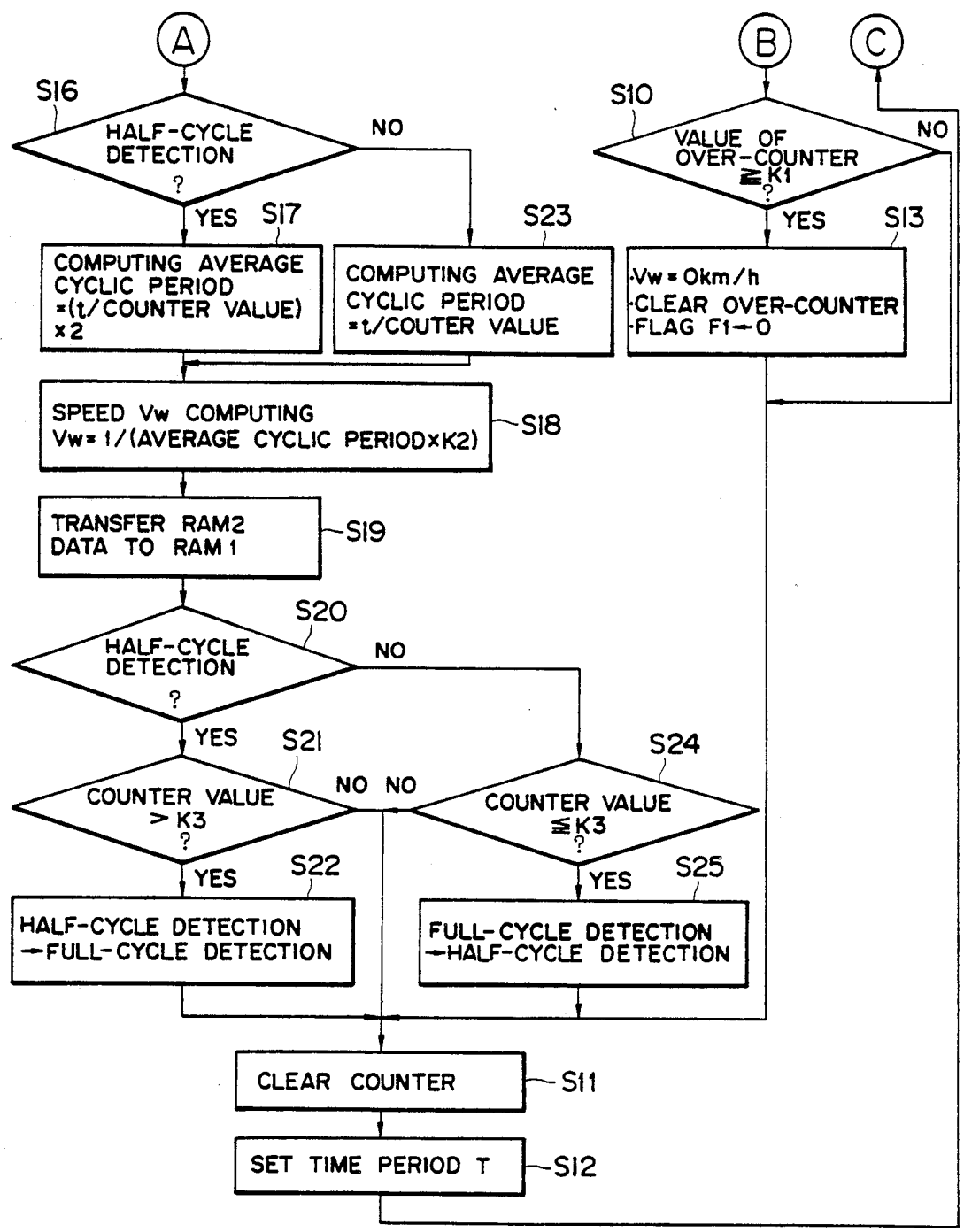

FIGS. 6 and 7 are flow charts for speed computation executed by the CPU 9 of FIG. 1.

At step S1 of FIG. 6, speed computation reference time T is set up; half-cycle detection is selected as pulse-edge detection mode; and rising pulse edge is selected as trigger pulse. At step S2, judgment is made as to whether or not the time T has elapsed; and when the result of the judgment is "NO", a pulse edge is detected at step S3. Let it be assumed that a pulse edge was detected as shown at time point A in FIG. 5(a). At the next step S4, judgment is made as to whether the pulse edge detected at the step S3 is the first pulse edge or not. If the result of the judgment as the step S4 is "YES", then the process proceeds to step S5 where the time point A is written in the RAM 1 as cycle measurement starting time point, the counter is cleared and flag F1 for recognition of the first pulse edge is raised. At step S6, judgment is made as to whether or not half-cycle detection is to be effected, and if the result of the judgment is "YES", then trigger edge change-over is effected at step S7 and the process returns to the step S2.

When it is judged at the step S2 that time T has elapsed, the process proceeds to step S8 where judgment is made as to whether or not the counter has been cleared. In this case, the result of the judgment at the step S8 is "YES" since the counter has been cleared at the step S5, and thus the process proceeds to step S9. Referring to FIG. 5(a), since two or more pulse edges are not detected during the period from the time point "1" to the time point "2", the count of the over-counter is incremented by 1. At step S10 of FIG. 7, judgment is made as to whether or not the count of the over-counter is greater than the specified constant K1 (K1=4, for example). In this case, the counter value is 1 and the process proceeds through step S11 to step S12 where time period T from the time "2" to the time "3" is set up again as shown in FIG. 5(a); then the process returns to the step S2 of FIG. 6. In this case, since no pulse edge is detected during the period from the time "2" to the time "3", the process goes around from the step S2 to the step S3 and back to the step S2, and then proceeds to the step S9 where the count of the over-counter becomes 2. The process further proceeds to the steps S10, S11 and S12 in the named order so that the time period T from the time "3" to the time "4" is set up. In a similar manner, the time period T from the time "4" to the time "5" is set up. If the count of the over-counter becomes higher than the specified constant K1 (K1=4, for example) through repetition of the above-mentioned steps, the wheel speed is regarded as Vw=0 km/h at the step S13 so that the over-counter is cleared, and the flag F1 is brought down; then the process returns to step S2.

In the case of FIG. 5(a), however, K1=3 and a pulse edge is detected at the time point B in the time period from the time "4" to the time "5", so that the result of judgment at the step S3 is "YES" and the result of judgment at the step S4 is "NO"; thus the process proceeds to the step S14 where the timing corresponding to the time point B is written in RAM 2 in which the cycle measurement termination timing is also written, and the count of the pulse edge counter is incremented by 1. The process then goes through the steps S6 and S7 and returns to the step S2. When the time "5" of FIG. 5(a) is reached, the process proceeds to the step S8; the result of the judgment at the step S8 is "NO"; the process proceeds to the step S15 where the timing written in the RAM 1 is subtracted from the timing written in the RAM 2; and the time period t from the time A to the time point B is thereby determined. The process then proceeds to the step S16 of FIG. 7 where judgment is made as to whether or not half-cycle detection is to be effected. Since the result of the judgment at the step S16 is "YES", the process proceeds to step S17 where an average cycle is determined by dividing the time period t by the counter value and doubling the quotient, and then the process proceeds to the step S18. In the case of FIG. 5(a), the counter value is 1 and thus no division needs to be executed.

At the step S18, the wheel speed Vw is computed on the basis of the average cycle determined at the step S17, in accordance with an equation Vw=1/(average cycle×K2). At the next step S19, the value of the RAM 2 is transferred to the RAM 1 so that the value thus transferred is used as the next cycle measurement starting time. At step S20, judgment is again made as to whether or not half-cycle detection is to be effected; and at the step S21, judgment is made as to whether the counter value is greater than a predetermined value K3 (K3=9, for example). Since the result of the judgment at the step S21 is "NO", the process proceeds to the step S11 where the counter is cleared; and at the step S12, the time period T from the time "5" to the time "6" is set up again and the process returns to the step S2.

For measurement with respect to the time period from the time point A to the time point B in FIG. 5(b), the counter value occurring at a time point when the speed computation reference T including the time point B elapses, is 2, and thus the average cycle becomes equal to the value of the time period t (t/2×2). In the case of FIG. 4, when time "3" is reached, the time point B when the last pulse edge between the time "2" and the time "3" is detected has been written in the RAM 2 and the counter value has been 3. Thus, at the step S17, the average cycle is computed as t/3×2.

In the case of FIG. 5(c), the counter value is higher than the predetermined value K3 (K3=9 in this case), the result of the judgment at the step S21 is "YES" and thus the process proceeds to the step S16 where the pulse edge detection mode is switched from half-cycle detection to full-cycle detection. As a consequence, the result of the judgment at the step S16 is "NO"; thus the process proceeds to the step S23 where computation is performed such that the time period t is divided by the counter value so that average cycle is determined.

In the case of the FIG. 5(d), the result of the judgment at the step S20 is "NO" and the counter value is less than the predetermined value K3 (K3=2 in this case). Thus, the process proceeds to the step S25 via the step S24 and the full-cycle detection is switched to half-cycle detection.

While the present invention has been illustrated and described with respect to specific embodiments, it is to be understood that the present invention is by no means limited thereto but encompasses all changes and modifications which will become possible within the scope of the appended claims.

I claim:

1. A method of computing a rotating speed of a rotating body, comprising the steps of:
   (a) successively setting up fixed speed computation reference time periods T with respect to a pulse train signal derived from a rotating speed sensor located on the rotating body wherein a time point when a last pulse edge in a previous speed computation reference time period T is detected is the time point when speed measurement starts and a time point when a last pulse edge in a correct speed computation reference time period is detected is the time point when the speed measurement is eliminated,
   (b) measuring time period from a last pulse edge of said pulse train signal in a previous speed computation reference time period T to a last pulse edge in a current speed computation reference time period T;
   (c) counting the number of pulse edges that occur during said time period t wherein when the counted number of pulse edges in said time period t exceeds a predetermined number, pulse edge detection mode is switched from double-edge detection to single-edge detection by switching means in response thereto; and
   (d) computing the rotating speed of said rotating body on the basis of the result of the time period measurement.

2. The method according to claim 1 wherein said predetermined number of pulse edges is 9.

3. The method according to claim 1 wherein while single-edge detection is being effected, if the number of single pulse edges in said time period t becomes smaller than a predetermined number, the single-edge detection is switched to double-edge detection.

4. The method according to claim 3, wherein the predetermined number of pulse edges is 2.

* * * * *